United States Patent Office 2,873,815
Patented Feb. 17, 1959

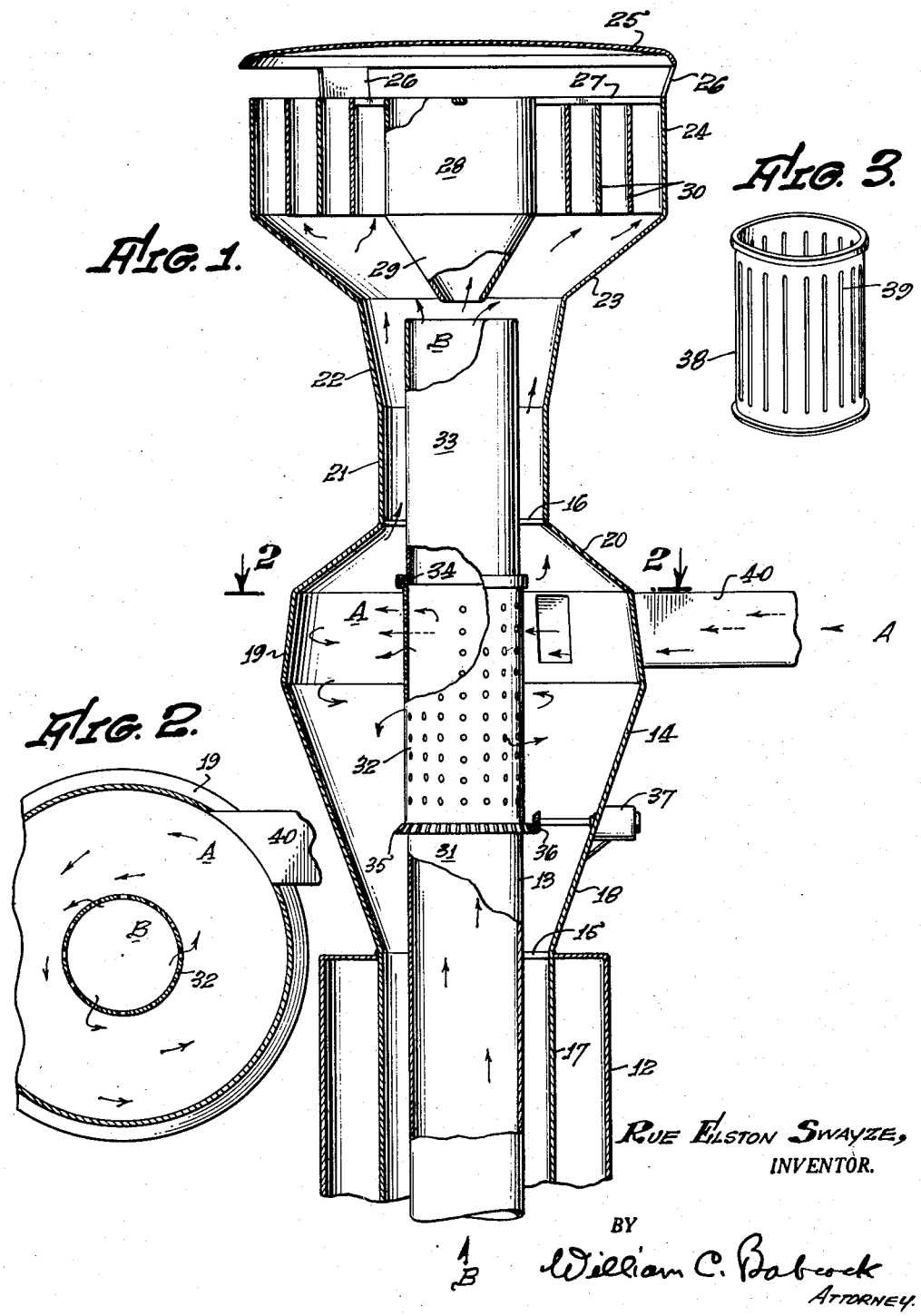

2,873,815

APPARATUS FOR PURIFYING EXHAUST GASES

Rue Elston Swayze, Long Beach, Calif.

Application December 5, 1955, Serial No. 550,970

5 Claims. (Cl. 183—5)

This invention is concerned with an apparatus for purifying gases containing particulate matter resulting from combustion or industrial processes, and more particularly relates to cyclonic fluid separators for accomplishing removal of atmospheric contaminants from a stream of gas by inducing rotation of an exhaust gas stream with a clean air stream.

One of the grave difficulties presently facing most processors and manufacturers who must release exhaust gases and other fluids into the atmosphere is that of removing pollutants from such gases prior to release. While many devices and methods serving this purpose to some extent have been proposed and are in use, all suffer from either a lack of desired efficiency in their inability to remove particles of varying weight and size from the gas to be purified, or from excessive initial and maintenance costs.

It is therefore a principal object of my invention to provide an inexpensive apparatus for removing particulate pollutants from industrial and combustion gases in such a manner that varying-size particles may be removed therefrom with equal efficiency.

Other more specific objects will appear from consideration of the accompanying drawings in which:

Figure 1 is a side view of my apparatus shown partly in cross section;

Figure 2 is a sectional view taken on line 2—2 of Figure 1; and

Figure 3 is a perspective view illustrating a modified form of rotary baffle core for my device.

With more particular reference to the drawing, my apparatus is secured to a support 12 directly over an exhaust gas outlet so that the gas which it is desired to purify is directed through internal conduit 13. This conduit is secured axially in any suitable manner as by spokes 15 and 16 within a housing 14 which is fixed to the support 12.

The housing 14 is composed of eight distinct cylindrical or frusto-conical sections. The lowest portion of the housing is a cylindrical section 17 which provides, with a lower imperforate section of conduit 13, an annular trap for collected dust or other impurities. Upwardly adjacent to this cylindrical section and extending therefrom is an inverted frusto-conically shaped section 18. Extending consecutively from the uppermost run of the inverted conical section 18, and from the uppermost runs of succeeding sections, are: inlet frusto-conical section 19; frusto-conical section 20; cylindrical venturi conduit 21; lower outlet inverted frusto-conical section 22; intermediate outlet inverted frusto-conical section 23, and upper outlet cylindrical section 24. Adjacent to but spaced from the section 24 is an external baffle 25 normal to the axis of the conduit 13 and housing 14. This external baffle, which is shown arcuated upwardly, but which may be flat or arcuated downwardly, is secured to the rim of section 23 by spaced support members 26. Secured to, and depending from suitably spaced spokes 27 fixed at their outermost edges to the upper edge of the outlet cylindrical section 24, is a cylindrical conduit 28 whose diameter is greater than the diameter of the conduit 13, terminating in a hollow inverted, frusto-conical shell 29 whose open end is in the plane of the upper edge of the lower outlet inverted, conical section 23. The diameter of the open end of shell 29 is less than the diameter of conduit 13.

Depending from and fixed to spokes 27 is a plurality of concentric cylindrical baffles 30, the axes of which coincide with the axes of conduit 13 and housing 14 and which terminate in the plane of the lower edge of upper outlet cylindrical section 24. Conduit 13 extends aixally within the housing 14 and terminates at its outlet end in a plane spaced axially from the open end of frusto-conical shell 29. This conduit includes an imperforate base section 31 which extends through the chamber defined by cylindrical section 17 and provides an inner peripheral wall for the annular dust trap. Base section 31 terminates within the chamber defined by inverted conical section 18, and is provided with a bearing (not shown) upon which a perforate cylindrical shell baffle 32 is rotatably mounted. This baffle extends axially into the chamber defined by inlet conical section 19 and terminates in the plane of the upper edge of said section. The outlet imperforate head section 33 of conduit 13, which is secured to housing 14 by the spokes 16, as noted above, is provided with a bearing flange 34 upon which perforate shell baffle 32 is free to rotate. This baffle is furnished with a bevel gear 35, secured to its lower peripheral edge, which is engaged by a spur bevel 36 driven by motor 37.

If desired, the perforate baffle 32 may take the form of the baffle 38 shown in Figure 3 in which the perforations are longitudinal slits 39 extending parallel to the axis of the baffle element.

Secured tangentially to conical section 19 is an inlet pipe 40 through which uncontaminated air may be introduced under pressure to provide a high velocity air stream which rotates rapidly within the chamber defined by inverted conical section 18, inlet conical section 19, and conical section 20. The rapid rotation of this air stream, signified generally by reference letter A, induces rotation of the exhaust gas stream B within the perforate baffle 32 of conduit 13. The rotational velocity of gas stream B is further increased by the rotation of the perforate baffle driven by motor 37. As a consequence of the rotation of gas stream B a centrifugal force is imposed upon the particulate matter contaminating that stream, and the particles are impelled outwardly where they strike the interior surface of baffle 32. As a further result of the centrifugal force acting upon these particles, they are impelled through the perforations in that baffle and are caught up in the rotational stream A which accelerates them radially outwardly until they impinge upon the interior of the housing 14. Frictional contact with the housing reduces their velocity, and gravity then causes them to settle gradually into the lower portions of the chamber defined by inverted conical section 18 where their rotational velocity is further decreased as a function of their distance from inlet pipe 40. Ultimately they settle into the sediment trap from which they can be removed in known manners.

It will be noted that as a result of the high velocities of air stream A an area of reduced pressure is present exteriorly adjacent of the perforate baffle 32. The higher pressures within and immediately adjacent to the interior surface of baffle 32 thus act upon particles in the immediate vicinity of any of the perforations and eject them from the gas stream to be purified.

I have further discovered that providing a cross-sectional area in a zone positioned intermediately of the inlet for air stream A and the outlet of conduit 13 for gas stream B, which is less than the cross-sectional area at either the inlet for stream A or the outlet for stream B, creates a venturi effect which in the area immediately externally adjacent of said outlet, results in the radial expansion of gases within said conduit. The presence of the hollow inverted frusto-conical shell 29 aids in the performance of this function. Exhaust gases B, after passing through the perforate baffle zone of the conduit, still contain insignificant amounts of smaller, lighter particles which it is nevertheless desirable to remove. As a result of the continuing but lessened rotational velocity of stream B at the outlet of conduit 13, the remaining impurities will be concentrated adjacent to the interior surface of that conduit and will, due to decreased pressures radially externally of said conduit, be exhausted in such manner as to impinge and collect upon concentric baffles 30, thus further purifying the exhaust gas stream B. External horizontal baffle 25 assists in causing the deposition of these particles upon baffles 30 by setting up eddy currents at their upper ends. It will additionally be noted that the rotational velocity of air stream A is sufficient to result in a residuary rotational velocity of gases in the area of concentric baffles 30, thus further inducing deposition of small, light particles upon these baffles.

It will thus be evident that I have discovered an apparatus which can be cheaply constructed and operated at relatively low cost to remove particulate matter efficiently from exhaust industrial gases. It should also be noted that although the particular structure shown and described constitutes the presently preferred embodiment of the invention, various modifications and changes may be made thereto without departing from the spirit of the invention or the scope of the appended claims.

I claim:

1. A device for centrifuging particled material from an upwardly moving exhaust gas by means of a high velocity air stream, comprising: a first vertically disposed imperforate tubular member having a lower intake end through which said gas enters said member; a second vertically disposed imperforate tubular member coaxially positioned above said first member; a perforate tubular baffle coaxially positioned between and interconnecting said first and second members, said baffle and said members all being of the same cross-sectional area and together defining an unobstructed straight vertical passage for the upward movement of said gas therethrough and out of the upper end of said second member; an imperforate housing coaxially surrounding and outwardly spaced from said member and said baffle and having an open upper end for exhausting an air stream, a portion of said housing more closely surrounding said first member than said housing surrounds said baffle to define an annular trap with said first member for the reception of particled material separated from said gas; and an inlet pipe connected at one end to a source of high velocity air and connected at the other end to the annular space between said housing and said baffle and adapted to substantially horizontally direct a stream of said air into said housing substantially tangentially to the interior surface of said housing whereby said stream of air is constrained by said housing into cyclonic rotational movement within said housing to induce rotation of said gas passing upwardly through said baffle whereby a centrifugal force is imposed on particled matter in said gas to centrifuge said particled matter through said baffle, said particled matter thereafter descending into said trap, said stream of air escaping through said open upper end of said housing and said gas escaping from said baffle through said second member after said particled material has been removed therefrom.

2. A device as defined in claim 1 wherein a portion of said housing below said inlet member tapers downwardly and inwardly toward said first tubular member and cooperates therewith to define a space of annulus shaped cross section that gradually decreases in cross section, in which space the rotation of said stream of air is gradually retarded due to frictional contact with the interior surface of said housing and the exterior surface of said first member to permit said particled material ejected from said gas through said perforations to fall into said trap.

3. A device as defined in claim 1 wherein said perforated baffle is rotatably mounted between said tubular members and is drivingly engaged with a prime mover for rotating said perforated member, with the rotation of said member augmenting the rotation of said gas and particled material in said perforated member to cause the separation thereof.

4. A device for centrifuging particled material from an upwardly moving exhaust gas by means of a high velocity air stream, comprising: tubular means defining an unobstructed vertical passage for the upward movement of said exhaust gas therethrough, said tubular means communicating through a lower intake end thereof with a source of said gas and having a plurality of spaced-apart perforations throughout an axially extending, intermediate section thereof and having an upper outlet end for said gas; a housing coaxially encompassing and outwardly spaced from said tubular means and of reduced transverse cross section at the lower end thereof to define, with an imperforate portion of said tubular means spaced downwardly from said perforations, an annular trap for the reception of particled material to be separated from said gas, and said housing terminating in an open upper end spaced above said perforations whereby a passage is provided between said tubular means and said housing for an air stream introduced into the annular space between said housing and said tubular means, said air passage being separate from the passage for said gas through said tubular means in order to substantially prevent commingling of said air and gas; inlet means for communicating said annular space between said housing and said tubular means with a source of high velocity air and adapted to substantially horizontally direct a stream of said air into said housing substantially tangentially to the interior surface of said housing and remotely from said tubular means through an opening in said housing opposite said perforations, said high velocity air stream rotating in said annular space to induce rotary movement of gas in said tubular means, said rotating gas thereby increasing in density at the interior surface of said tubular means and being substantially confined against further centrifugal movement by said tubular means, said particled material entrained in said rotating gas being centrifugally moved against the interior surface of said tubular means to centrifugally escape through said perforations to subsequently fall into said trap, said gas continuing its unobstructed vertical passage after loss of said particled material, and said rotating air inducing decreased density of said air adjacent the exterior surface of said tubular means to aid in the escape of said particled material through said perforations.

5. A device for separating particled material from an upwardly moving exhaust gas, comprising: a vertically disposed cylindrical base section communicating through the lower end thereof with a source of said gas; a vertically disposed cylindrical head section coaxially mounted above said base section; a perforated cylindrical baffle rotatably mounted at opposite ends thereof on the confronting ends of said base section and head section in coaxial alignment therewith, said sections and said baffle providing a straight unobstructed passage for said gas; a vertically disposed housing of circular transverse cross-section coaxially surrounding and outwardly spaced from said base section, head section, and baffle, said housing oppositely to said baffle being formed with an inverted frusto-conical section tapering downwardly and inwardly, the lower end of said housing oppositely to said base section being formed with a reduced diameter portion defining with the exterior of said base section a trap for the reception of particled material to be separated from said gas through said baffle, and said housing upwardly from said baffle and oppositely to said head section being formed with a frusto-conical section surmounted by a cylindrical venturi conduit adapted to define a venturi means with the exterior surface of said head section and terminating in an upwardly opening end adjacent the upper open end of said head section whereby a passage is provided for air introduced into said housing that is separate from the passage for said gas until after heavier particled materials have been removed during passage of said gas through said baffle, said venturi means being adapted to induce radial expansion of gas emerging from said head section whereby residual lighter particled material will be centrifuged; baffle means mounted on the upper end of said housing adapted for deposition thereon of said centrifuged lighter particled material; an air inlet pipe communicating with a high velocity air stream source and adapted to substantially horizontally direct said air stream into said housing substantially tangentially to the interior surface of said housing in a portion of said housing opposite the upper end portion of said rotatable baffle, said air stream rotating in said housing to induce rotation of gas passing upwardly through said baffle while said baffle limits centrifugal movement of said rotating gas, whereby a higher pressure is produced immediately adjacent the interior surface of said baffle than is produced immediately adjacent the exterior surface of said baffle to force heavier particled materials outwardly through the perforations of said baffle to subsequently fall into said trap; and means to drivingly connect said baffle to a prime mover for rotating said baffle to aid in rotating said gas and said air to centrifugally augment said pressure differential to induce centrifugal separation of said heavier particled material from said gas through the perforations of said baffle.

References Cited in the file of this patent

UNITED STATES PATENTS

| | | |
|---|---|---|
| 602,964 | Van Gelder | Apr. 26, 1898 |
| 1,022,441 | Roderick | Apr. 9, 1912 |
| 1,325,376 | Reilly | Dec. 16, 1919 |
| 1,479,714 | Herdle | Jan. 1, 1924 |
| 2,252,581 | Saint-Jacques | Aug. 12, 1941 |
| 2,425,588 | Alexander | Aug. 12, 1947 |
| 2,511,713 | Hoyle et al. | June 13, 1950 |
| 2,698,672 | Burnside et al. | Jan. 4, 1955 |
| 2,732,913 | Higgins | Jan. 31, 1956 |

FOREIGN PATENTS

| | | |
|---|---|---|
| 599,420 | Germany | July 5, 1934 |
| 477,269 | Italy | Jan. 16, 1953 |
| 717,848 | Great Britain | Nov. 3, 1954 |